(12) United States Patent
Aumueller et al.

(10) Patent No.: US 6,178,851 B1
(45) Date of Patent: Jan. 30, 2001

(54) GEAR FOR TWIN-SCREW EXTRUDER

(75) Inventors: Marion Aumueller, Schmitten; Alfred Berky; Guido Koch, both of Oberursel; Lothar Thiel, Usingen, all of (DE)

(73) Assignee: P.I.V. Antrieb Werner Reimers GmbH & Co. KG, Bad Homburg (DE)

( * ) Notice: Under 35 U.S.C. 154(b), the term of this patent shall be extended for 0 days.

(21) Appl. No.: 09/127,921

(22) Filed: Aug. 3, 1998

(30) Foreign Application Priority Data

Aug. 2, 1997 (DE) .......................................... 297 13 785 U

(51) Int. Cl.[7] .................................................... F16H 57/02
(52) U.S. Cl. .................................. 74/606 R; 74/665 GA
(58) Field of Search .......................... 74/606 R, 665 A, 74/665 B, 665 E, 665 GA

(56) References Cited

U.S. PATENT DOCUMENTS

| | | | |
|---|---|---|---|
| 1,817,216 | * 8/1931 | Uggla | 74/606 R |
| 1,914,763 | * 6/1933 | Varkas | 74/606 R |
| 2,133,135 | * 10/1938 | Doran | 74/606 R |
| 2,167,065 | * 7/1939 | Eckert | 74/606 R |
| 2,911,845 | * 11/1959 | North | 74/606 R |
| 2,912,882 | * 11/1959 | Wilson | 74/606 R |
| 3,358,528 | * 12/1967 | Herbert | 74/606 R |
| 3,601,859 | * 8/1971 | Selbach | 18/12 SP |
| 4,457,187 | * 7/1984 | Tsuboi | 74/606 R |
| 4,786,180 | * 11/1988 | Chszaniecki et al. | 74/606 R |
| 4,856,367 | * 8/1989 | Nemoto | 74/606 R |
| 5,078,105 | * 1/1992 | Ito et al. | 74/606 R |
| 5,156,576 | * 10/1992 | Johnson | 74/606 R |
| 5,186,078 | * 2/1993 | Kameda et al. | 74/606 R |
| 5,483,852 | * 1/1996 | Stuemky | 74/665 GA |
| 5,505,101 | * 4/1996 | Curtis | 74/606 R |
| 5,593,000 | * 1/1997 | Johnson | 74/606 R |
| 5,694,816 | * 12/1997 | Okada et al. | 74/606 R |
| 5,907,982 | * 6/1999 | Urban | 74/606 R |

FOREIGN PATENT DOCUMENTS

| | | |
|---|---|---|
| 714787 | 9/1968 | (BE) . |
| 3431547A1 | 3/1986 | (DE) . |
| 9311027U1 | 12/1993 | (DE) . |
| 4305133A1 | 8/1994 | (DE) . |

* cited by examiner

*Primary Examiner*—David A. Bucci
*Assistant Examiner*—Chong H. Kim
(74) *Attorney, Agent, or Firm*—Venable; George H. Spencer; Robert Kinberg

(57) ABSTRACT

The gear for twin-screw extruders having a first output shaft which is driven by a drive shaft and a second output shaft which is driven by the first output shaft via two side shafts which are arranged on both sides. The shafts are arranged parallel and inside a joint gearbox case which is divided along a vertical junction plane into two gearbox case halves. The junction plane extends between the axes of the two output shafts.

5 Claims, 4 Drawing Sheets

GEAR FOR TWIN-SCREW EXTRUDER

CROSS-REFERENCE TO RELATED APPLICATION

This application claims the priority of Patent Application Ser. No. 297 13 785.9, filed in Germany on Aug. 2, 1997, the subject matter of which is incorporated herein by reference.

BACKGROUND OF THE INVENTION

The present invention relates to a gear for twin-screw extruders with a first output shaft, driven by a drive shaft in particular via a reduction gear, and a second output shaft, driven by the first output shaft via two side shafts, arranged on both sides, wherein the shafts are arranged axis parallel and inside a joint gearbox case. There exist various designs for gearbox cases known in the technology. For example, there exists a gearbox case consisting of four gearbox case parts which are attached to each other via horizontal junction planes. The center junction plane extends exactly through the axes of the two drive shafts, while the upper and lower junction planes extend through the axes of the side shafts and parallel to the center junction plane. Owing to the arrangement of the gear train between the two output shafts and the side shafts in the form of a rectangle with the gear shaft axes positioned at its corner points, it is possible to have a continuous adjustment of the spacing between the side-by-side arranged output shafts may be adjusted continuous.

Such gearboxes, which are divided into four parts, result in a drawback, in that when the axial spacing between the two output shafts is changed, the spacing between the two side shafts is changed as well because the length of the gear train remains the same. As a result, the side shafts creep from the associated separating joint, which requires the adaptation and displacement of the separating joints that extend through the axes for the side shafts. This in turn, means that each new axial spacing between the output shafts requires the adaptation of all four gearbox parts that adjoin the side shafts, so that a complete separate gearbox case must be provided even for the slightest difference in the axial spacing.

Based on the foregoing, it is the object of the present invention to provide a gear for twin-screw extruders of the aforementioned type, which gear permits a continuous change in the axial spacing while the gearbox case parts remain unchanged and which is accordingly simplified considerably with respect to the variant variety of these parts.

SUMMARY OF THE INVENTION

The above object is solved in accordance with the present invention in that the gearbox case is divided along a vertical junction plane into two gearbox case halves, and that the junction plane extends between the axes of the two output shafts. The vertical separation of the gearbox case by a plane that is parallel to the shaft axes has the advantage that the gear can be assembled or disassembled easily by swinging open the gearbox case. This is preferably done by disengaging one of the output shafts from the side shafts during the opening of the gearbox case, thereby making all shafts freely accessible, even though they are still held securely inside their rolling bearing seats.

With this form of divided gearbox case, the junction plane no longer extends through the shaft axes and thus also cannot divide the rolling bearing seats into halves. As a result of the optimum accessibility of the shafts or rolling bearing seats when the gearbox case is opened up, it is possible to produce the rolling bearings seats independent of the respective position in the gearbox case, but only after the gearbox case halves have been produced by drilling the rolling bearing seats in the gearbox case. The individual shafts are then installed by inserting them or fitting them in and the bearings are subsequently pressed in, that is to say once again without having to consider the axial spacing of output shafts and side shafts for the form of the gearbox case parts or when positioning the junction plane.

It is conceivable that rolling bearing seats can theoretically be produced in this way for state of the technology horizontal separating joints. However, using this gear assembly method does not accomplish the desired result because of the problems associated with the joining and assembling of a divided horizontal gearbox case in that the side shafts, for example, are no longer accessible once the output shafts have been installed. Rather, with a horizontal division of the gearbox case, this requires all shaft axes to be positioned in each case exactly in the associated junction plane, since the poured-in rolling bearing seats become accessible only then and the inserting of the bearings or the shafts is made possible.

To be sure, gearboxes with a vertical junction plane are known from the state of the technology. However, this vertical junction plane extends perpendicular to the axes for the output or side shafts, wherein up to four gearbox case parts are arranged one after another. This design also has the additional significant disadvantage that in order to open the gearbox case, the shafts and their bearings must first be removed from the rolling bearing seats, thereby making access to the gear very difficult and complicated. The initial installation of the gear is correspondingly complicated.

All these disadvantages of the state of the technology are avoided for the gear according to the invention as a result of the favorable arrangement of the junction plane. Owing to the fact that the rolling bearing seats are not positioned in the gearbox case until later on, in a precise adaptation to the respective application case, the axial spacing of the output shafts can be changed continuously over a larger range, without requiring a new gearbox case or individual new gearbox case parts. Thus, the essential advantage of this design is that any axial spacing desired by the client can be realized over a wider range and that despite the varied axial spacing, only the two equal gearbox case halves are necessary for this. In other words, it is not necessary to provide new, separate gearbox case parts for different axial spacings, but only to provide new bores in the complete gearbox case.

Also, the same gear train consisting of the same gearing parts can be used, even for varied axial spacings. Neither the side shafts, nor the output shafts are fixed exactly in their position relative to the junction plane. Consequently, these shafts can have a nearly optional arrangement inside the gearbox case while the rectangular drive train is maintained. The position of the rolling bearing seats is in turn adapted to this and they are subsequently drilled into the gearbox case. In other words, the present invention makes it possible to use the same gear train with all its individual parts for many different application cases since the position of the rolling bearing seats is independent of the junction plane.

On the whole, this leads to a strong decrease in the parts variety and a corresponding increase in the lot sizes for the individual parts and thus to considerable cost-savings on the whole.

Furthermore, the spectrum of axial spacings required by the market can also be supplied without interruption by the present invention for a specific rotational moment range in that the axial spacings for various gear sizes overlap. In addition, if a gear for a large machine requiring only a low rotational moment is required, it is possible to use a gear with smaller gear size for which the maximum rotational moment of the output shaft corresponds to the required rotational moment and which has a larger axial spacing that is adapted to the large machine, thereby leading to a corresponding cost reduction.

Another advantage of the present invention is that only two casting patterns are therefore still required for a complete gearbox case and this for a plurality of axial drive shaft spacings, whereas the state of the technology required four new patterns for each individual desired axial spacing. The gear according to the invention with the vertical junction plane also makes it possible to integrate the reducing section into the gearbox case so that a separate gearbox case need no longer be provided for the reducing section. Thus, the complete gear only needs two patterns. The distance piece for the output shaft is the only one that must be poured or produced separately, as for the state of the technology.

Concerning the exact position of the junction plane, it is recommended that this plane extend through the rolling bearing seats of the side shafts and, in particular, is at a distance to the axes of the side shafts. This results in the advantage that no bearing forces of the output shafts and also no bearing forces of the side shafts affect the junction plane since all associated bearing locations are held form-locking in the gearbox case webs. In addition, this form-fitting engagement makes it much easier to handle the gear which can be turned or pivoted without auxiliary device, even if the gearbox case is open, without the bearings or shafts falling out. In other words, in order to access the gear, one must only unscrew the output shaft distance piece and the separating joint can then be opened to access the gear.

Finally, the junction plane may be arranged parallel to the output shafts and thus perpendicular to the plane formed by the two output shafts. In view of the ease with which the gear can be handled, it can also be advantageous if the two gearbox case halves are mutually connected such that they can pivot and swing open, wherein the pivoting axis is arranged advantageously in the region of the lower horizontal edge for the case halves, which is located in the junction plane.

BRIEF DESCRIPTION OF THE DRAWINGS

These and other features and advantages of the invention will be further understood from the following detailed description of the preferred embodiments with reference to the accompanying drawings in which.

DETAILED DESCRIPTION OF THE PREFERRED EMBODIMENTS

Figure 1:
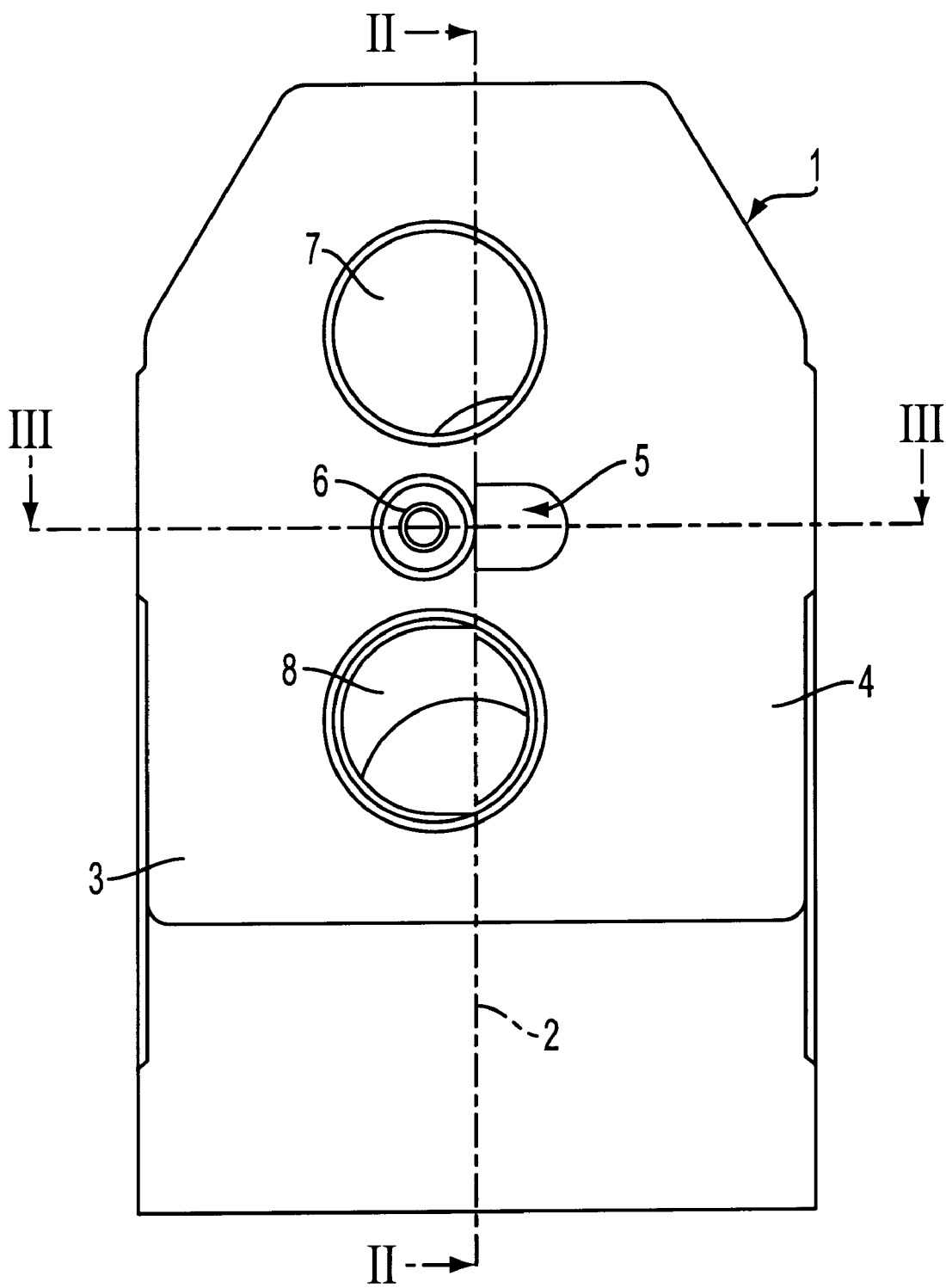
FIG. 1 Shows a gearbox case for a gear according to the invention, as seen from the front.

FIG. 1 shows a gearbox case 1 for a twin-shaft extruder gear in a view from the front, the gearbox case is divided along a vertical junction plane 2 into two mirror-inverted gearbox case halves 3, 4. Two output shafts 5, 6 are arranged side-by-side approximately in the center of the gearbox case, which shafts extend horizontally from the gearbox case front toward the back and into the drawing plane in FIG. 1. In the interests of clarity, the output shaft 6 is only indicated through the symmetry lines and is not illustrated.

The junction plane 2 is arranged such that it extends exactly between the two output shafts. The output shaft 5, shown on the right in FIG. 1, drives via two side shafts 7, 8 the output shaft 6, arranged to the left of it, whereas the two side shafts 7, 8 are arranged, respectively, below and above the two output shafts, as more clearly shown in FIG. 4. The junction plane 2 extends crosswise through the associated rolling bearing seats for the side shafts 7, 8, wherein the axes of the side shafts, however, are at a distance to the junction plane and the crossing through of the rolling bearing seats 70, 80 in FIG. 1 is displaced to the right. As a result of this asymmetrical division of the rolling bearing seats 70, 80, the gearbox case can be taken apart along the junction plane, without the two side shafts 7, 8 or their bearings falling out of the rolling bearing seats 78, 80 since these are held form-locking in the rolling bearing seats 78, 80.

The same applies for the two output shafts 5, 6, which are also surrounded by the gearbox case and are anchored form-locking inside the gearbox case.

Figure 4:
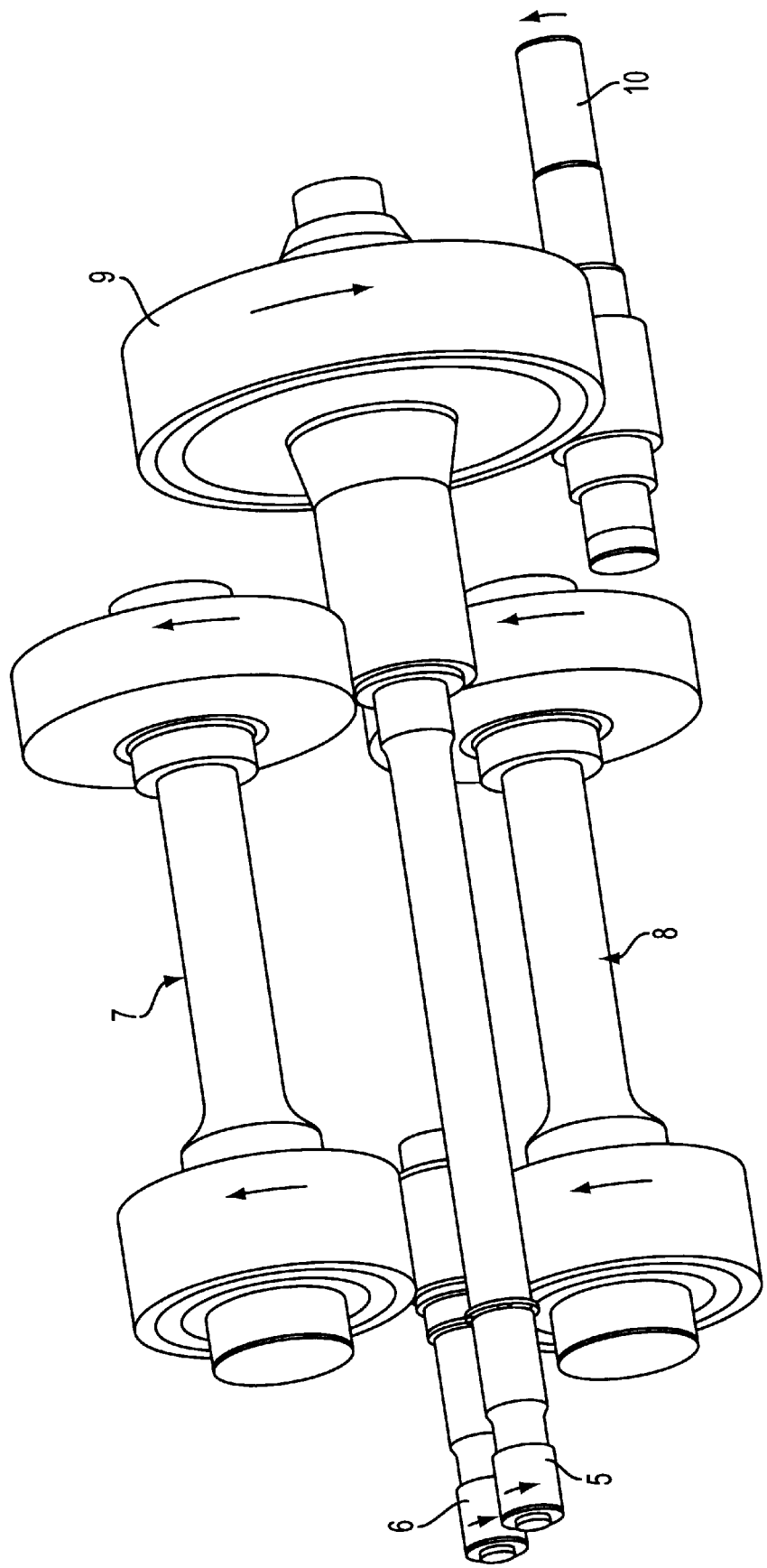
FIG. 4 is a perspective view showing the driven shafts of the invention.

FIG. 4 shows the gear without the gearbox case 1, showing the respective interaction of the side shafts 7, 8 with the two output shafts 5, 6. It can be seen that the two side shafts 7, 8 are driven by the first output shaft 5 and in turn the side shafts drive the second output shaft 6.

Figure 2:
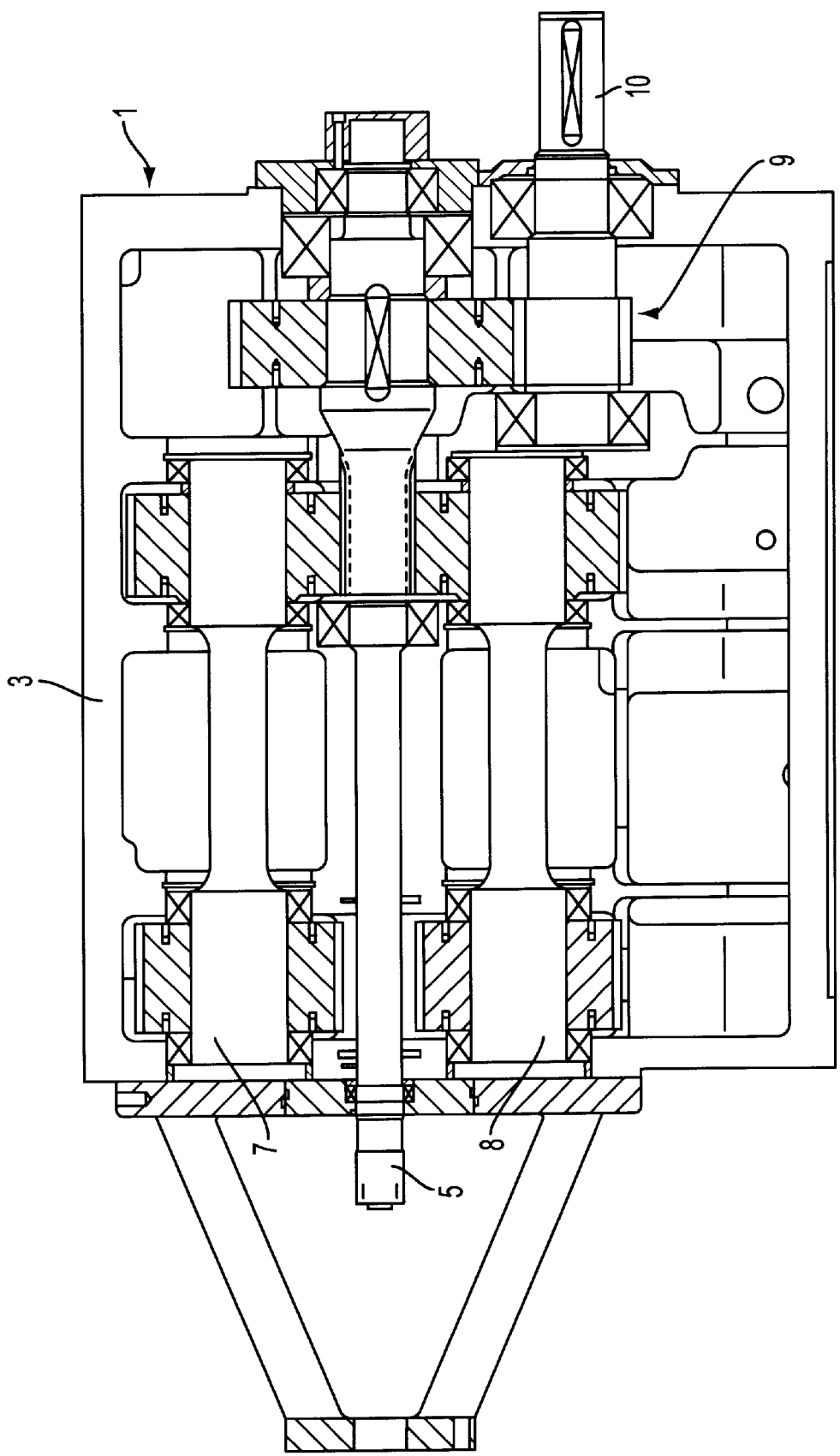
FIG. 2 Is a sectional view of the gear of FIG. 1, taken on line of FIG. 1.
Figure 3:
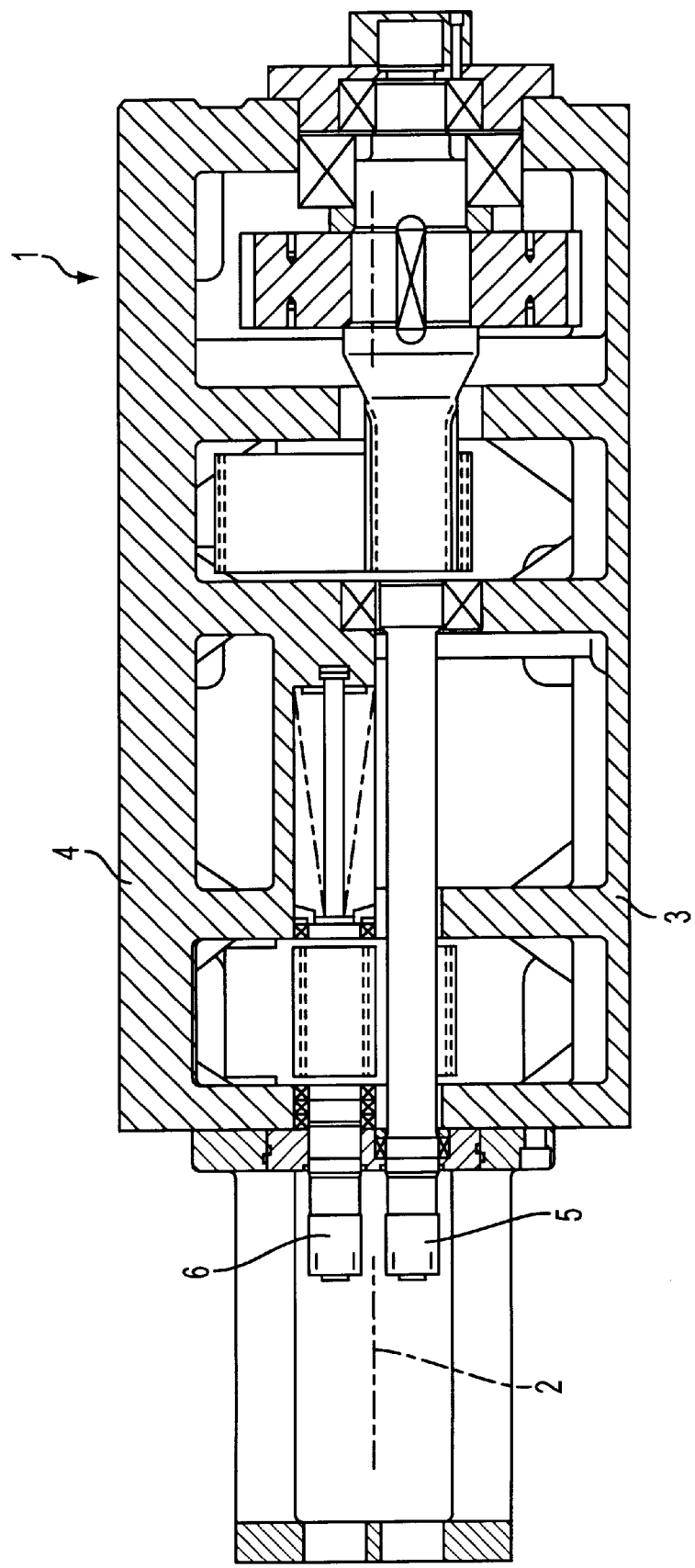
FIG. 3 Is a sectional view of the gear taken on line III—III of FIG. 1.

The ratio of engagement for output shafts and side shafts and how they are disposed inside the gearbox case can be seen in particular in FIGS. 2 and 3. These figures show that the output shaft 5 traverses through the complete depth of the gearbox case and intermeshes at the rear end with a reduction gear 9, which is driven via a drive shaft 10. The output shaft 6 extends only to about half the depth of the gearbox case where it meshes with the two side shafts 7, 8, which in turn are driven by the output shaft 5. Thus, the driving torque is transmitted from the drive shaft 10 via the reduction gear 9 to the continuous output shaft 5, which drives with half a rotational moment directly into the extruder, whereas the remaining rotational moment is transmitted via the two side shafts (torsion shafts) 7, 8 to the short output shaft 6 and from there into the extruder.

The section along the line A—A in FIG. 2 corresponds exactly to the course of the junction plane 2, while the section along the line B—B is arranged perpendicular to this, and the junction plane 2 can again be seen in its center. FIGS. 2 and 3 also show that a changed output shaft spacing does not affect the way the gearbox case halves look, in particular since the two gearbox case halves are poured first and the rolling bearing seats 70, 80 for the output shafts or the side shafts are drilled subsequently. The shafts here are installed by inserting them.

In summary, the advantage of the present invention is that when using equal wheel sets, a gearbox case consisting of two halves can be used for several different axial spacings for the output shaft, without requiring a special adaptation of the form for the case. In addition, the gearbox case only needs two case halves owing to the vertical separation plane, which correspondingly reduces the parts variety further. Finally, it is also easier to handle the gear when the case is opened in that the shafts or bearings respectively are held form-locking inside the rolling bearing seats.

It will be understood that the above description of the present invention is susceptible to various modifications, changes and adaptations, and the same are intended to be comprehended within the meaning and range of equivalents of the appended claims.

What is claimed is:

1. A gear for a twin screw extruder, comprising: a joint gearbox; a first output shaft having a first axis and being driven by a drive shaft; a second output shaft having a second axis, said output shafts being parallel with one another and arranged inside the joint gearbox; two side shafts arranged on opposite sides, respectively, of the first and second output shafts, said second output shaft being driven by the first output shaft via the two side shafts; said gearbox case being divided along a vertical junction plane into two gearbox case halves, wherein said junction plane extends between said axes for the two output shafts.

2. A gear according to claim 1, further comprising a set of roller bearing seats for the side shafts, wherein said junction plane extends through the set of rolling bearing seats.

3. A gear according to claim 2, wherein said junction plane is positioned at a distance to the axes for the side shafts.

4. A gear according to claim 1, wherein said junction plane is parallel to said output shafts.

5. A gear according to claim 4, wherein said junction plane is arranged perpendicular to the plane formed by said two output shafts.

* * * * *